United States Patent [19]
Stone

[11] Patent Number: 6,093,325
[45] Date of Patent: Jul. 25, 2000

[54] METHOD OF DYE REMOVAL FOR THE TEXTILE INDUSTRY

[75] Inventor: Mark L. Stone, Idaho Falls, Id.

[73] Assignee: Bechtel BWXT Idaho, LLC, Idaho Falls, Id.

[21] Appl. No.: 08/906,383

[22] Filed: Aug. 5, 1997

[51] Int. Cl.[7] .................................................. B01D 61/00
[52] U.S. Cl. ...................... 210/654; 210/651; 210/653; 210/652
[58] Field of Search ................................... 210/650, 651, 210/652, 653, 654, 500.27, 500.25

[56] References Cited

U.S. PATENT DOCUMENTS

| | | | |
|---|---|---|---|
| 4,477,656 | 10/1984 | Longo et al. | 528/487 |
| 4,576,806 | 3/1986 | Juneau | 423/300 |
| 4,749,489 | 6/1988 | Allen et al. | 210/500.28 |
| 4,783,202 | 11/1988 | Kraus et al. | 55/16 |
| 5,022,996 | 6/1991 | McCaffrey et al. | 210/654 |
| 5,066,398 | 11/1991 | Soria et al. | 210/321.89 |
| 5,238,569 | 8/1993 | Soria et al. | 210/500.27 |
| 5,266,207 | 11/1993 | Boye et al. | 210/653 |
| 5,451,322 | 9/1995 | Nelson et al. | 210/653 |

FOREIGN PATENT DOCUMENTS

| | | | |
|---|---|---|---|
| 0648584 | 3/1995 | Switzerland | 210/651 |

OTHER PUBLICATIONS

Allen, et al., "Separation of Cr Ions from Co and Mn Ions by Poly(Bis(Phenoxy)Phosphazene) Membranes", Journal of Membrane Science, 33 (1987) pp. 181–189.

Cecille and Toussaint, Future Industrial Prospects of Membrane Processes, article by Gaeta et al., "A Study on Membrane Technology for the Textile Industry: Membrane Preparation and Characterization", pp. 19, 202, 1989.

Peterson et al., "Chemical Separations Using Shell and Tube Composite Polyphosphazene Membranes", Separation Science and Technology, 30(7–9), pp. 1573–1587, 1995.

"Dyes, Environmental Chemistry", Kirk–Othmer Encyclopedia of Chemical Technology, Fourth Edition, vol. 8, pp. 753–773.

"Elastomers, Synthetic (Phosphazenes)", Kirk–Othmer (Supra), pp. 1022–1031.

"Inorganic High Polymers", Kirk–Othmer (Supra), vol. 14, pp. 504–513.

*Primary Examiner*—Ana Fortuna
*Attorney, Agent, or Firm*—Pedersen Clark, PLLC

[57] ABSTRACT

The invention comprises a method of processing a waste stream containing dyes, such as a dye bath used in the textile industry. The invention comprises using an inorganic-based polymer, such as polyphosphazene, to separate dyes and/or other chemicals from the waste stream. Membranes comprising polyphosphazene have the chemical and thermal stability to survive the harsh, high temperature environment of dye waste streams, and have been shown to completely separate dyes from the waste stream. Several polyphosplhazene membranes having a variety of organic substituent have been shown effective in removing color from waste streams.

13 Claims, 1 Drawing Sheet

6,093,325

METHOD OF DYE REMOVAL FOR THE TEXTILE INDUSTRY

CONTRACTUAL ORIGIN OF THE INVENTION

The United States Government has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

This invention relates, in general, to aqueous waste stream clean-up. More specifically, it relates to the processing of a waste stream to remove dyes and other undesirable compounds, by using a non-organic-based class of polymers, called polyphosphazencs. This invention is expected to be of particular benefit to the dye manufacturing and textile industries, in which there are economic and environmental incentives to remove dyes from plant effluents.

2. Related Art

In the textile industry, an area of major concern is the liquid waste stream from the dying process or from dye manufacturing processes. Such effluents contain leftover dyes and associated chemicals, which can create an economic loss and environmental concerns if the waste stream is not properly treated and the chemicals not recovered. Even in the many cases where dyes are not toxic to the environment, they are unsightly when discharged to waterways. Treating dye bath effluent to remove color has proven difficult, however, because of the high temperature and harsh chemical environment of such waste streams.

Current processing schemes for dye-containing effluents include a variety of chemical treatments. Such as oxidation, neutralization and destructive reduction, a variety of biological treatments, such as activated sludge, stabilization ponds, aerated lagoons, and trickling filters, and various physical treatments, such as carbon absorption, incineration, polymer flocculation, and sedimentation. In addition, reverse osmosis and ultra-filtration have also been used to treat dye waste streams, with films of cellulose acetate, asymmetric p(olyamide. or polyamide composites (Kirk-Othmer Encyclopedia of Chemical Technology, John Wiley & Sons, 1993, vol. 8, pp. 753–773).

What is still needed is an improved processing scheme that can operate at high temperatures and a harsh chemical environment to recover dyes and other chemicals for recycle back to the dye bath and for protection of the environment.

SUMMARY OF THE INVENTION

The invention comprises a method of processing a waste stream containing dyes, such as a dye bath used in the textile industry. The invention comprises using an inorganic-based polymer, such as polyphosphazene, to separate dyes and/or other chemicals from the waste stream. Membranes comprising polyphosphazene have the chemical and thermal stability to survive the harsh, high temperature environment of dye waste streams, and have been shown to completely remove color from dye-containing waste streams.

DESCRIPTION OF THE PREFERRED EMBODIMENTS

Figure 1:
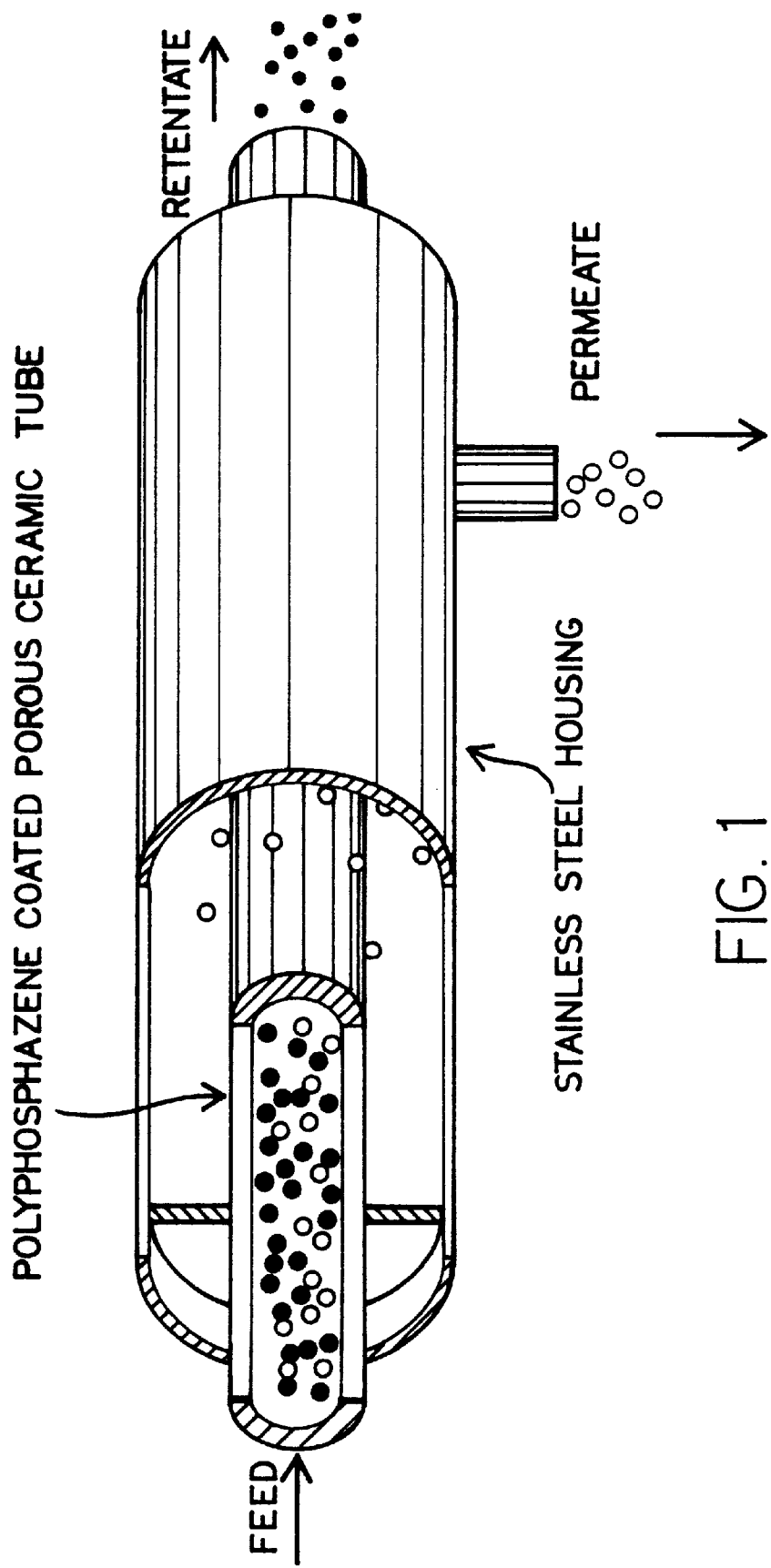
FIG. 1 is a schematic of one embodiment of the invented method of dye removal.

The present invention comprises dye and/or chemical removal from dye-containing aqueous waste streams by using a phosphazene polymer material. Embodiments of the invented method include, but are not limited to, using a polyphosphazene membrane in a plain diffusion, pervaporation, or reverse osmosis separation process, which processes are well known in the separations industry and may be adjusted by one skilled in the art as appropriate to the particular application.

Polyphosphazenes are defined broadly as a class of polymers having a "backbone" of alternating phosphorus and nitrogen atoms linked by alternating single and double bonds. In addition to the backbone bonding (that is, between P and N), the phosphorus atoms have two additional bonding sites that may be substituted with chemical moieties that are tailored to function in specific applications. Thus, the present invention comprises the use of polyphosphazenes comprising a plurality of

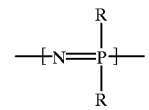

units, wherein the various side groups R may be the same or different.

Many phosphazene polymers have been described in polymer literature, including linear, cyclo-linear, and cyclo-matrix polymers (U.S. Pat. No. 4,749,489 to Allen, et al.), and including many variations based on differing substituent groups on the phosphorus atoms. Allen, et al. describes replacement of the chlorine atoms of a base, un-substituted phosphazene polymer with organic groups such as hydroxyl, primary amine, secondary amine, or mercapto groups. Soria, et al (U.S. Pat. No. 5,066,398) discloses polyalkoxyphosphazenes, polyalkylaminephosphazenes, and polyaryloxyphosphazenes, having substituent groups comprising alkyl groups linked to the phosphorus by oxygen or nitrogen, or comprising benzene or substituted benzene rings linked to the phosphorus by oxygen. Further, Boyc et al. (U.S. Pat. No. 5,266,207) discloses many examples of radicals which may be substituent groups on the polyphosphazene phosphorus.

Polyphosphazene chemistry and membrane manufacture is vell-known in polymer art, and has been described in such references as Peterson, et al., "Chernical Separations Using Shell and Tube Composite Polyphosphazene Membranes", *Separation Science and Technology*, 30(7–9) pp. 1573–1587, 1995, and Allen, et al., "Separation of Cr Ions front Co and Mn Ions by Poly(Bis(Phenoxy)Phosphazene) Membranes", *Journal of Membrane Science*, 33 (1987) pp. 181–189. Examples of polyphosphazene synthesis may be found in Allen, et al, which shows generalized reaction routes for substitution of side groups on a polyphosphazene backbone, and summarizes a synthesis of polybis(phenoxy) phosphazene ("PPOP") which results in a polymer solid that is a white, fibrous, flexible, film-forming material that dissolves easily in tetrahydrofliran.

Polyphosplhazene materials are available commercially from such sources as ELF AOCHEM™ of France, with offices in New York, and EYPFL™ from Ethyl Corporation, with offices in Louisiana.

The invented separation process may use various forms of phosphazenie polymer layers, and various substrates that are known in the art. For example, a thin phosplhazene polymer may be knife cast onto a porous substrate that acts as a mechanical support for the thin polymer film. In other applications, the polyphosphazene may be formed into a hollow-fiber system or coated onto an existing sheet or hollow fiber of another polymer type.

The preferred embodiments of the invention use linear phosphazene polymers, which may be described by the general formula (1) below. The phosphorus atoms each carry two substituents, R, which may be identical or different, and which preferably comprise various organic ligands. as described above. The invention may comprise phosplhazenc polymer having all substituent groups ($R_1$) being the same, as represented by Formula 2 below, or by phosplhazene polymer having different substituent groups ($R_1$, $R_2$), as represented by Formula 3 below. The relative substitutions of $R_1$ and $R_2$ may be determined by, for example, the relative concentrations of $R_1$ and $R_2$ in the synthesis and, sometimes, by the order in which the backbone is substituted.

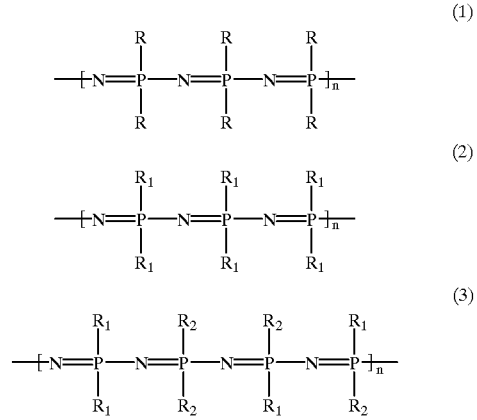

wherein $n \geq 1$

A "mix" of chemical moieties in a membrane may be achieved by using a polyphosphazene with different ligands on the same backbone, as in Formula 3, or by physically mixing two or more different phosphazene polymers together before casting into a membrane. Therefore, a membrane of the preferred embodiment may be a single polymer according to either Formula 2 or 3, for example, or a mix of two or more polymers, such as represented by Formulas 4 and 5.

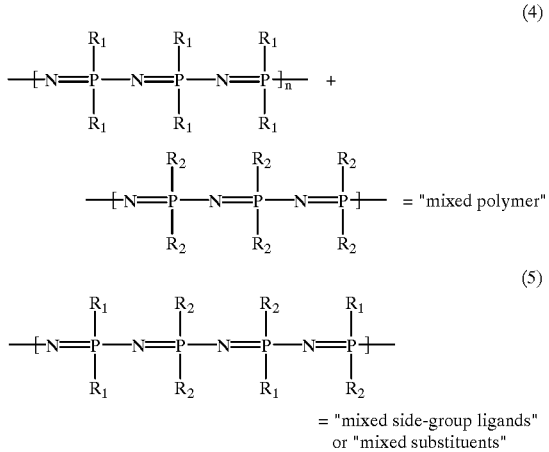

Once the polyphosphazene membrane is chosen and is mechanically supported, a feed from a dye bath is passed over the membrane. Material that permeates through the membrane (permeate) is collected and material that does not pass through the membrane (rejectate) is collected, as shown in FIG. 1. In a commercial operation, the permeate largely comprises water from the feed stream, while the rejectate typically is a concentrated solution containing the dyes and other chemicals rejected by the polyphosphazene membrane. The permeate may be processed further or discharged from the textile facility, and the rejectate may be recycled to the dye bath or further processed for disposal. Thus, the invented process allows separation and recovery of a dye-rich stream and discharge of a cleaner, clear stream.

In the preferred embodiments of the invented methods, polyphosphazene membranes have been shown to separate substantially all of the dye from the aqueous solutions, producing clear permeate without a trace of color and with greatly reduced salt content. The following tests of the invented color removal process illustrate these results.

Water-Dye Pervaporation Separation Testing

Using Various Polyphosphazeiie Membranes and Various Dyes

Feed: Buffered aqueous solution made by adding 0.09 g of a given dye, 6 g sodium chloride, and 1 g sodium carbonate to a quantity of water sufficient to make a total volume of 100 ml solution, resulting in solution having 27,900 ppm sodium.

Dye: Various reactive dyes of colors noted below. The dye samples were obtained from commercial textile companies.

Conditions: Feed rate=75 ml/min., feed pressure=0 psig, permeate pressure=140 mm Hg absolute.

Membranes: Various polyphosphazene polymers as noted below, each polymer being a polymer or polymer mixture coated into a 0.2 micron ceramic tube for mechanical support, and tested in a pervaporation separation system, as shown schematically in FIG. 1. Except for the "Lt. 2% EYPEL-F" membrane of Test Group V below, all membranes were made by dissolving the polymer at a level of 4 wt % in THF solvent before knife casting. The "Lt. 2%" tests of Test Group V utilized a membrane cast from a solution of 2 wt % EYPEL-F dissolved in THF.

| | 17/23 Test Group I | | | |
|---|---|---|---|---|
| Run No. | Run Temp, °C. | Run Time, hr. | Permeate Flux, $l/m^2$-hr. | Permeate Volume, ml | Permeate Color |
| 1 | 22 | 7 | — | Trace (T) | — |
| 2 | 22 | 7 | 0.005 | 0 | Clear |
| 3 | 40 | 6 | — | T | — |
| 4 | 40 | 2 | — | T | — |
| 5 | 60 | 6 | 0.157 | 5 | Clear |
| 6 | 60 | 8 | 0.029 | 1 | Clear |
| 7 | 60 | 7 | 0.000 | T | — |
| 8 | 60 | 7 | 0.000 | T | — |
| 9 | 60 | 6 | 0.000 | T | — |
| 10 | 60 | 5 | 0.026 | 1 | Clear |
| 11 | 60 | 5 | 0.019 | 1 | Clear |

Tests 1–11 used phosphazene polymer 33% $NH_2$ Poly (bisphenoxy)phosphazene ("33% $NH_2$ PPOP"); and turquoise dye in buffered aqueous solution. 33% $NH_2$ PPOP polymer may be represented by:

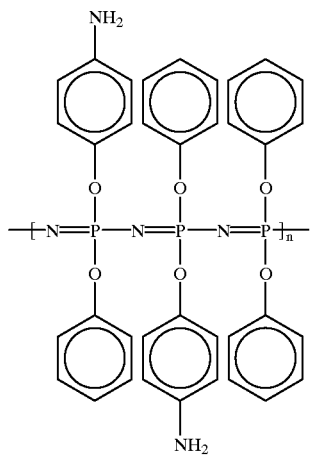

wherein it may be noted that 33% of the phosphorus substituents comprise (—O—$C_6H_4$—$NH_2$) and 67% of the substituents comprise (—O—$C_6H_5$). This polymer may be synthesized by a process, closely related to the synthesis of poly(bisphenoxy)phosphazene (see Allen, et al, *Journal of Membrane Science*, supra), which may be summarized as follows:

(1) Hexachlorocyclotriphosphazene was polymerized under vacuum at 250° C. for 48 hr.
(2) The polymerized material was dissolved in toluene and purified by precipitation into heptane.
(3) The pure poly (dichlorophosphazene) was dissolved in dry toluene and added to a THF+Diglyme solution containing 20 mole percent excess sodium phenoxide. (Mole percentages are based on the number of moles of chlorine in poly (dichlorophosphazene).)
(4) This solution was refluxed at approximately 115° C. for 42 hr. THF was removed using a Dean-Stark trap until a constant reflux temperature of 115° C. is achieved.
(5) After cooling, the reaction mixture was precipitated into a large excess of methanol.
(6) The solids were separated by filtration and were washed with water and methanol to remove occluded sodium chloride.
(7) The polymer was purified by dissolving in tetrahydrofuran and precipitation into a large excess of water.
(8) Air-drying was done for 12 hours, followed by vacuum drying for 2 days.

A nucleophilic substitution process was then used to attach aryloxiles to the polymer produced by steps 1–8. The aryloxides were synthesized by mixing nitropheniol with phenol and treating with base. After attachment of the aryloxides, the resulting polymer was exposed to a reducing agent to convert the nitro-groups to amino-groups.

Test Group II:

Same Feed as Test Group I, with run temperature set at 60° C. Phosphazene polymer was 8% COOH PPOP. This 8% COOH PPOP polymer is a partially carboxylated PPOP, wherein approximately 8% of the phosphorus substituents are (—O—$C_6H_4$—COOH), and the other approximately 92% of the substituents are the standard PPOP group. (—O—$C_6H_5$).

Three tests were performed on three consecutive days. Results: failed, no permeation.

Test Group III

| Test No. | Run Temp, °C. | Run Time, hr. | Permeate Volume, ml | Permeate Color |
|---|---|---|---|---|
| 1 | 22 | 2 | 1 | Clear |
| 2 | 33 | 7 | 6 | Clear |
| 3 | 45 | 7 | 5 | Clear |
| 4 | 50 | 7 | 5 | Clear |
| 5 | 50 | 6 | 5 | Clear |
| 6 | 60 | 6 | 8 | Clear |
| 7 | 22 | 5 | 1 | Clear |
| 8 | 33 | 7 | 3 | Clear |
| 9 | 50 | 7 | 6 | Clear |
| 10 | 40 | 7 | 7 | Clear |
| 11 | 40 | 7 | 7 | Clear |
| 12 | 40 | 7 | 7 | Clear |

Tests 1–12 used EYPEL-F™ phosphazene polymer and the feed was the same as used for Test Groups I and II. The EYPEL-F™ polymer comprises trifluoroethoxy substituents and may be the formula:

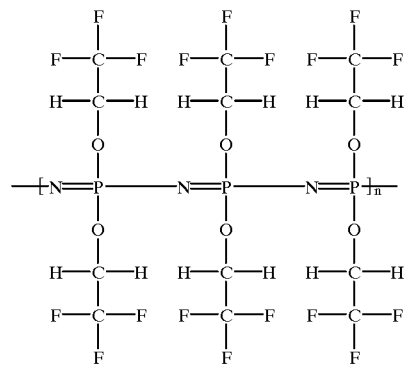

Test Group IV

| Test No. | Run Temp, °C. | Run Time, hr. | Permeate Volume, ml | Permeate Color |
|---|---|---|---|---|
| 1–10 | 22–40 | 4–7 | 2–9 | All permeates clear |
| 11–18 | 50–60 | 4–8 | 3–8 | All permeates clear |
| 19–27 | 40–60 except for test 19 at 22 C. | 6–7 | 3–5 | All permeates clear |
| 28–32 | 40–60 except test 30 at 22 C. | 5–6 | 3–5 | All permeates clear |
| 33–47 | 40–60 except test 36 at 22 C. | 4–7 | 1–10 | All permeates clear |

Tests 1–47 used EYPEL-F™ phosphazene polymer.

Tests 1–18 used red dye in buffered aqueous solution as feed.

Tests 19–27 changed to black dye solution as feed.

Tests 28–32 changed to blue dye solution as feed

Tests 33–47 changed to "SLF Yellow" dye solution as feed.

Test Group V

| Test No. | Run Temp, °C. | Run Time, hr. | Permeate Volume, ml | Permeate Color |
|---|---|---|---|---|
| 1–8 | 22–60 | 5–6 | 2–5 | All permeates clear |
| 9–20 | 22–60 | 6 | 2–8 | All permeates clear |
| 21–26 | 22–70 | 6 | 1–5 (permeation not consistent) | All permeates clear |
| 27–38 | 22–40 | 4–6 | no or trace permeation | Permeates clear when present |

Tests 1–38 used "SLF Yellow" dye buffered solution as feed. Tests 1–8 used a "Lt 2%" EYPEL-F™ phosphazene polymer.

Tests 9–20 used PEG/XL phosplhazene polymer. PEG/XL polymer comprises a 50%—50% mixture of fully-substituted PEG polymer (shown below) and a cross-linking polymer, "ATOCHEM™ Z-1002-A" (also called "ATOCHEM XL" or "ATOCHEM cross-link"). ATOCHEM XL is available from ELF ATOCHEM, North America and has been described as comprising

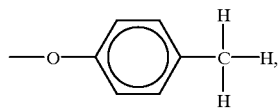

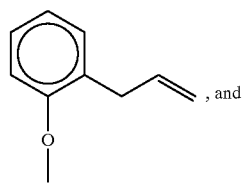

substituents.

Tests 21–26 used PEG phosphazenie polymer. PEG polymer comprises polyethyleneglycol substituents and may be represented by the formula:

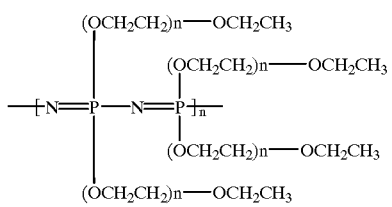

wherein n ≥ 1

Tests 27–38 used 50%—50% mix of P-MEO and 33% NH₂ PPOP phosplhazene polymer coated into the ceramic tube. "P-MEO" stands for poly[bis(p-methoxyphenoxy)] phosphazene and comprises p-methoxy phenoxy groups, as illustrated by:

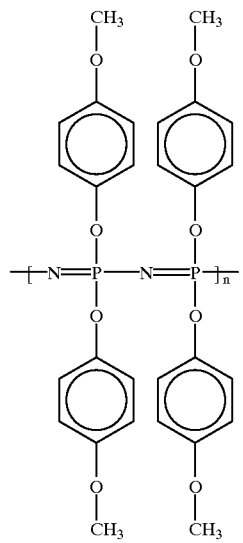

Test Group VI:

| Test No. | Run Temp, °C. | Run Time, hr. | Permeate Volume, ml | Permeate Color |
|---|---|---|---|---|
| 1–4 | 22–50 | 6 | 2 | All permeates clear |
| 5–9 | 22–50 | 6 | Trace | All permeate clear |
| 10–13 | 22–40 | 6 | Trace–1 ml | All permeate clear |
| 14, 15 | 40 | 6 | 2–4 | Yellow |
| 16–33 | 22–50 | 6 | Trace–1 ml | All permeate clear |
| 34–35 | 22 | 6 | 2–4 | Clear |
| 36 | 50 | 6 | 20 | Yellow |
| 37–38 | 22 | 6 | | Light-yellow, yellow |
| 39–60 | 40 | 3–6 | 1–4 | All permeate clear |
| 61–69 | 40–65 | 3–6 | 1–2 | All permeate clear |
| 70–76 | 40–45 | 6–7 | 3–20 | All permeate clear |

Tests 1–76 used "SLF Yellow" dye buffered solution as feed.

Tests 1–9 used 50%—50% mix of EYPEL-F and ATOCHEM™ Z-1002-A.

Tests 10–15 phosphazene polymer: 100% COOH—PPOP, in which all phospholus substituents are phenoxy groups substituted with (—COOH). The feed pH was approximately 8.

Tests 16–33 phosphazenie polymer: 50%—50% mix of 100% COOH-PPOP and ATOCHEM XL.

Tests 34–36 phosphazene polymer: 100% COOH—PPOP

Tests 37–38 phosphazene polymer: 80%–20% mix of 100% COOH—PPOP and ATOCHEM XL

Tests 39–69 phosphazene polymer: Tetradecyl-Aniline-PPOP. Tetradecyl-Aniline-PPOP may be described as:

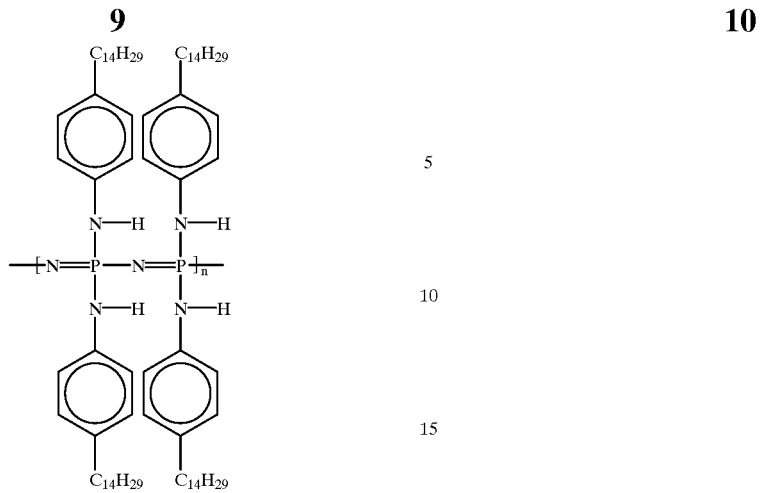

Tests 70–76 plhosphazene polymer: cyclohexanol DEG, which may be described as a phosphazene polymer with mixed ligands, that is, dietliyleneglycol monomethyether ligands ($-OCH_2CH_2OCH_2CH_2OCH_3$) on half of the side-group substitution sites and cyclohexanol ligands ($-OC_6H_{11}$) on the other half of the sites on the same backbone The above Test Groups I–VI may be summarized as follows: .

| Test No. | Feed | Membrane | Notation |
| --- | --- | --- | --- |
| Test Group I | Turquoise (TRQ) DYE | 33% $NH_2$-PPOP | Some Permeation But Not Consistent |
| Test Group II | TRQ DYE | 8% COOH-PPOP | No Permeation |
|  | TRQ DYE | 8% COOH-PPOP | No Permeation |
|  | TRQ DYE | 8% COOH-PPOP | No Permeation |
| Test Group III | TRQ DYE | EYPEL-F | Good Permeation and Separation |
| Test Group IV: |  |  |  |
| Tests 1–18 | RED | EYPEL-F | Good Permeation and Separation |
| Tests 19–27 | BLACK | EYPEL-F | Good Permeation and Separation |
| Tests 28–32 | BLUE | EYPEL-F | Good Permeation and Separation |
| Tests 33–47 | YELLOW | EYPEL-F | Good Permeation and Separation |
| Test Group V: |  |  |  |
| Tests 1–8 | YELLOW | Lt 2% EYPEL-F | Good Permeation and Separation |
| Tests 9–20 | YELLOW | PEG/XL 50%–50% mix | Good Permeation and Separation |
| Tests 21–26 | YELLOW | PEG | Some Permeation but not Consistent |
| Tests 27–38 | YELLOW | Mix of P-MEO and 33% $NH_2$-PPOP | No Permeation |
| Test Group VI: |  |  |  |
| Tests 1–9 | YELLOW | Mix of EYPEL-F and ATOCHEM XL | Some Permeation but not Consistent |
| Tests 10–15 | YELLOW | COOH-PPOP | Inconsistent and Some Yellow Permeate |
| Tests 16–33 | YELLOW | 50%–50% Mix of COOH-PPOP and ATOCHEM XL | Some Permeation but not Consistent |
| Tests 34–36 | YELLOW | COOH-PPOP | Inconsistent and Some Yellow Permeate |
| Tests 37–38 | YELLOW | 80%–20% Mix of COOH-PPOP and ATOCHEM XL | Inconsistent and Some Yellow Permeate |

-continued

| Test No. | Feed | Membrane | Notation |
|---|---|---|---|
| Tests 39–69 | YELLOW | Tetradecyl-Aniline-PPOP | Good Permeation and Separation |
| Tests 70–76 | YELLOW | Cyclohexanol-DEG | Good Permeation and Separation |

In summary, the polyphosphazene membranes showing superior performance were those comprising EYPEL-F, PEG, tetradeeyl-aniline-PPOP, or cylohexnol-DEG polymers. A wide variety of other polyphosphazene membranes are expected to be effective for the invented method, for various feeds, dyes, and process conditions.

The preferred embodiments of the invented separation process prevent dye from permeating through the membrane to an extent that results in a permeate stream that is clear or that has only a trace of color. Other embodiments of the invented process may prevent a substantial amount of dye from permeating through the membrane to reduce but not eliminate color in the permeate. "Color" may be measured by viewing with the human eye, or, as in the case of most of the above test results, by using visible absorption spectrometer tuned to a color (for example, red) by use of color standards.

The dyes used in Test Groups I–VI were reactive dyes obtained from commercial sources. The turquoise dye of Test Groups I, II, and III was Turquoise TM178 from Rite Industries, Inc. of Livingston, N.J. The red dye (Red TM179, H-E3B), Rie Reactive black dye (Rite reactive Black TM193 and Black-B), and blue dye (Rite Reactive Blue) were also obtained from Rite Industries, Inc. The "SLF Yellow" dye was obtained from Crompton & Knowles of Stamford, Conn.

Therefore, the preferred dyes of this invention are from the large class of reactive dyes, which are known in the industry, and which may be described as comprising three components: a dye or chromogen component, a bridging group, and a reactive group. Reactive dyes include a broad range of dyes, including, for example, azo dyes, anthraquirione, and phthalocyanine dyes (Kirk-Othniet sul, Vol. 8, pp. 810–823). Other dyes are also expected to be effectively removed by the separation methods of this invention, especially more non-volatile and higher molecular weight dyes.

Preferred feed streams for the invented methods are dye bath slip streams or other dye process streams. Alternatively, the feed stream for the invented methods may be any aqueous stream comprising a dye compound. The invented method is expected to be effective for feeds ranging from very acidic (1 to 2 pH) to basic (about 12 pH). Very basic feeds are expected to cause some damage to many posphazene polymers.

Preferred feed temperatures range from room temperature to approximately 100° C. and a major benefit of the invention is that it can be operated at high temperatures, for example, 50–100° C. Effective separation is expected in a wide range of temperatures, at least from about freezing to about boiling.

Standard separation process steps may be added to the invented process. For example, pre-filtration for particulate removal, or back-flushing to remove dye loading on the membrane, are expected to be effective.

Although this invention has been described above with reference to particular means, materials and embodiments, it is to be understood that the invention is not limited to these disclosed particulars, but extends instead to all equivalents within the scope of the following claims.

I claim:

1. A method of separating a dye from an aqueous stream, the method comprising:
    contacting a phosphazene polymer with an aqueous stream comprising a dye, so that the dye is substantially prevented from permeating through the phosphazene polymer; and
    collecting a permeate stream comprising water that has permeated through the phosphazence polymer.

2. A method as in claim 1, wherein said aqueous stream comprises a stream from a textile dye bath.

3. A method as in claim 2, wherein the separated dye remains in a rejectate stream and the method further comprises recycling said rejectate stream to a textile dye bath.

4. A method as in claim 1, wherein said phosphazene polymer comprises linear polyplhosphazene.

5. A method as in claim 1, wherein the phosphazenie polymer comprises phosphorus side-groups consisting of organic groups.

6. A method as in claim 1, wherein said phosphazene polymer comprises phosphorus having a trifluorethoxy substituent.

7. A method as in claim 1, wherein said phosphazene polymer comprises phosphorus having a polyethyleneglycol substituent.

8. A method as in claim 1, wherein said phosphazenie polymer comprises phosphorus having a ($-$NH$-$C$_6$H$_4-$C$_{14}$H$_{29}$) substituent.

9. A method as in claim 1, wherein said phosphazen, polymer comprises phosphorus having a ($-$O$-$C$_6$H$_{11}$) substituent.

10. A method as in claim 1, wherein said phosphazene polymer comprises phosphorus having a ($-$OCH$_2$CH$_2$OCH$_2$CH$_2$OCH$_3$) substituent.

11. A method as in claim 1, wherein the dye is a reactive dye.

12. A method as in claim 1, wherein the aqueous stream is between 50 to 100° C. when it contacts the phosphazene polymer.

13. A method of separating a dye from an aqueous stream, the method comprising:
    providing a membrane comprising a phosphazene polymer;
    contacting the membrane with a textile dye bath aqueous stream containing a dye, so that a portion of the textile dye bath stream permeates through the membrane, the permeating portion comprising water;
    collecting a stream that does not permeate through the membrane, the non-permeatinig stream comprising substantially all of the dye from said textile dye bath stream; and
    recycling the non-permeating stream to the textile dye bath.

\* \* \* \* \*